United States Patent [19]

Thrower, Jr.

[11] 4,038,048

[45] July 26, 1977

[54] LAPPING COMPOSITION CONTAINING A CARBOXY VINYL POLYMER

[76] Inventor: Herbert T. Thrower, Jr., 2612C Park Road, Charlotte, N.C. 28209

[21] Appl. No.: 649,014

[22] Filed: Jan. 14, 1976

Related U.S. Application Data

[63] Continuation-in-part of Ser. No. 549,816, Feb. 14, 1975, abandoned.

[51] Int. Cl.$^2$ .............................................. C09K 3/14
[52] U.S. Cl. .................................... 51/298 R; 51/308
[58] Field of Search ................. 51/306, 308, 298, 307

[56] References Cited

U.S. PATENT DOCUMENTS

| | | | |
|---|---|---|---|
| 2,783,137 | 2/1957 | Roth | 51/306 |
| 2,944,879 | 7/1960 | Allen et al. | 51/308 |
| 2,944,880 | 7/1960 | Allen et al. | 51/308 |
| 3,020,140 | 2/1962 | Bluth et al. | 51/306 |
| 3,663,475 | 5/1972 | Figiel | 51/306 |
| 3,715,842 | 2/1973 | Tredinnick et al. | 51/308 |
| 3,804,607 | 4/1974 | Jungell | 51/298 |
| 3,817,727 | 6/1974 | Yancey | 51/308 |

*Primary Examiner*—Donald J. Arnold
*Attorney, Agent, or Firm*—Wellington M. Manning, Jr.

[57] ABSTRACT

A composition is disclosed for lapping or sharpening various cutting edges with primary emphasis on reel type lawnmowers, especially those for cutting golf course greens and other important turf surfaces. The composition is a permanent suspension of a lapping gel and a grinding grit. Contents of the lapping gel include a carboxy vinyl polymer thickener, a neutralizing base, water and a surfactant as essential ingredients, though a concentrated gel may be produced and the water added later. Additionally, other ingredients may be included to improve shelf life, viscosity, stabilize freeze-thaw conditions and the like. Representative lapping compositions according to the present invention comprise 0.18 to 0.75 weight percent carboxy vinyl polymer; a sufficient amount of a base to neutralize the carboxy vinyl polymer and provide a pH in a range of about 7 to 9, at least about 0.08 weight percent surfactant; 1.2 to 2.4 weight percent of a humectant such as glycerine; a minor amount of a preservative for the surfactant such as formalin; 35 to 70 weight percent of a grinding grit and the balance water.

23 Claims, No Drawings

LAPPING COMPOSITION CONTAINING A CARBOXY VINYL POLYMER

CROSS REFERENCE TO RELATED APPLICATION

This is a continuation-in-part of a copending application Ser. No. 549,816, filed Feb. 14, 1975, now abandoned and entitled IMPROVED LAPPING CONSTRUCTION.

BACKGROUND OF THE INVENTION

Lapping compositions for polishing, sharpening and otherwise treating metal surfaces have heretofore been known. In general, the lapping compositions include an inorganic grit type material that serves as an abrasive, and that is suspended in a particular medium. The composition is applied with force against a particular surface to be polished, ground or the like.

Two types of lapping compounds or compositions really exist, being divided between polishing and grinding compounds. In a polishing composition, the grit is, of course, much smaller, is held in a particular type suspension, and is applied against a metal to be polished to obtain a smooth surface without residual scratches or other disfigurements. In a grinding composition, the grit is substantially larger, and is designed to abrade away a larger portion of a material without the necessity of obtaining an ultimate finely smooth, polished surface.

The present invention is directed primarily to a composition for use in sharpening or grinding cutting elements as opposed to polishing to a shine, though the composition of the present invention in particular embodiments may be employed for polishing application. Reel type lawnmowers for cutting industrial lawns, golf fairways, greens, tees, etc., athletic fields, parks and the like are set forth by way of example. For simplicity purposes, all further discussion is directed to a reel type mower, though as mentioned herein, numerous other cutting elements may likewise be sharpened by the present lapping composition. Very even cutting edges are necessary if the golf greens, for example, are to be properly cut. Extreme care must be taken to avoid uneven edges on the reel type mowers which will dish out the greens during cutting and leave uneven surfaces for putting. Generally speaking, the lapping compounds for reel type mowers have historically been oil base compositions, or liquid detergent base compositions.

Problems have existed with prior art lapping compositions. A general inability to retain the grit in suspension has been evident. Prior art compositions have experienced settling of the grit to the bottom of the medium. Thereafter, extreme difficulty is encountered for adequate remixing to the point of obtaining a good suspension. It is thus very difficult to obtain a uniformly sharp edge with prior art compositions since a permanent suspension is really needed to accomplish same. Furthermore, during sharpening of the lawnmower reels, which are normally driven backward by an external drive means at a speed of about 100 revolutions per minute, the grit of the prior art compositions has been slung off the reel by centrifugal force. As such, excess lapping composition has been required to replace that lost during lapping. Also, the possibility of uneven sharpening due to failure to maintain a proper level of lapping composition on the reel is always present.

Another problem that exists with prior compositions is removal of the composition from the reel after sharpening. Once the reel has been sharpened, it is absolutely necessary that all the grit be removed from the blades. Should any grit remain on the reel, continued grinding will occur during rotation of the reel. A dished out section will be produced on the blade very quickly which alters even cutting of the desired turf surface. With oil base systems, an organic solvent must first be applied onto the reel to cut the oil after which the reel must be washed. Furthermore, with a liquid detergent system, which usually contains sodium carboxy methylcellulose as a primary thickener, a permanent suspension is not found and also difficulty is experienced in complete cleaning of the reel as well as keeping the grit from walking off the reel during lapping.

The prior art does not teach or suggest the present invention. Exemplary of the prior art are U.S. Pat. No. 2,375,823 to Saunders et al.; U.S. Pat. No. 2,783,137 to Roth; U.S. Pat. No. 2,944,879 to Allen et al.; U.S. Pat. No. 2,944,880 to Allen et al.; U.S. Pat. No. 2,980,524 to Morton; U.S. Pat. No. 3,020,140 to Bluth et al.; U.S. Pat. No. 3,170,273 to Walsh et al.; U.S. Pat. No. 3,663,475 to Figiel; U.S. Pat. No. 3,715,842 to Tredinnick et al.; U.S. Pat. No. 3,779,727 to Siqui et al.; U.S. Pat. No. 3,804,607 to Jungell, and U.S. Pat. No. 3,817,727 to Yancey.

SUMMARY OF THE INVENTION

It is an object of the present invention to provide an improved lapping composition for sharpening cutting elements and the like.

Another object of the present invention is to provide an improved gel for use in an aqueous lapping composition.

Still another object of the present invention is to provide an improved lapping composition for use in sharpening reel type lawnmowers for use in cutting golf greens and other turf surfaces.

Generally speaking, the present invention relates to an aqueous lapping composition comprising a thickening gel, said gel comprising a carboxy vinyl polymer thickener, a base to neutralize the polymer, a surfactant and water; and an inorganic grinding grit.

More specifically, the aqueous gel is provided to thicken the overall composition and permanently hold the grit in suspension. The carboxy vinyl polymer is generally present in low concentration and is neutralized with an organic or inorganic base. A very viscous gel is provided at a pH in the range of about 7 to 10 with 7 to 9 being most preferred.

Under gel conditions without a freeze-thaw stabilizer, during thawing, the water may thaw at a more rapid rate than the remainder of the gel. A layer of water would thus result atop the gel after complete thawing. A minor amount of a glycol has been found to overcome this possible instability, and to cause the gel to thaw evenly. It has been further determined, however, that with certain compositions, a freeze-thaw stabilizer is not needed.

A surfactant is further included in the gel to permit good mixing if a gel concentrate is marketed. Likewise, and very importantly, the surfactant assists in removal of the grit during washing, and is considered essential to the composition. Also, a preservative for the surfactant and a humectant are included in preferred compositions.

Grinding media is not limited to any particular type of grit. All of the general grinding grits are suitable at a size of at least approximately 88 microns which corresponds to a 170 mesh grit size, U.S. Standard Sieve. No prewetting or premix considerations are necessary for the grit. Instead, according to the teachings of the present invention, it is only necessary to combine the ingredients and to mix them properly to attain a good suspension. At that point a permanent suspension exists.

the process for lapping reel type lawnmowers includes the steps of painting the lapping composition of the present invention onto the reel blades, rotating the reel backwards at a speed of approximately 100 revolutions per minute, adjusting a cutting bar to point contact with the reel blades, continuing to grind until smooth contact is made with the cutting bar along the length of the blades, and removing all grit from the blades and cutting bar.

DESCRIPTION OF THE PREFERRED EMBODIMENTS

The lapping composition of the present invention includes an aqueous suspension gel and a grinding grit. In producing the composition, there is no particular technique that is necessary for mixing the ingredients as has been the case for certain prior art compositions. Instead, a dry grinding grit, water, if not already included in proper amount in the gel, and the suspension gel are merely combined in a conventional mixer in proper proportions, whereupon the lapping composition is complete once sufficient mixing has been accomplished to properly suspend the grit. The grit is added last, however, to minimize equipment abrasion. The grit suspension according to the teachings of the present invention is permanent, and the grit will not settle to the bottom during ordinary life of the composition.

The suspension gel of the present lapping composition is a key element to the success of same. Water is a major constituent of the gel, though a gel concentrate may be provided which is later mixed with water. A freeze-thaw stabilizer is preferably included in an amount in the range of about 0.04 to 0.06 weight percent in certain compositions where low amounts of the carboxy vinyl polymer are employed, but in compositions using larger amounts of carboxy vinyl polymer, a freeze-thaw stabilizer is not needed. Generally speaking, the freezer-thaw stabilizer may be a glycol, such as ethylene glycol, diethylene glycol or the like. The stabilizer is not need in amount sufficient to depress the freezing point of the gel composition. Instead, the freeze-thaw stabilizer is provided so that after freezing, the gel composition will thaw evenly whereby a proper suspension remains during and following the thaw. Without the stabilizer, if needed, once the gel suspension is frozen and starts to thaw, a layer of water accumulates atop the composition which contains no suspended grit due to differing thaw rates. As such, the suspension has broken down somewhat and remixing necessary to reachieve the suspension is quite difficult.

The lapping gel further contains, as an essential ingredient, a surfactant which preferably is nonionic in character. Surfactants in general are suitable so long as they are compatible with the overall composition and do not deleteriously affect the intended use of same. An ethoxylated octyl phenol with 9 moles of ethylene oxide is preferred, being hydrophilic biodegradable and nonionic in character, though other surfactants may be employed such as other ethoxylated octyl and nonyl phenols with in general 8 to 15 moles of ehtylene oxide, sodium lauryl sulfate, and the like. The surfactant serves a dual purpose. First, if the lapping gel is manufactured and marketed as a concentrate for later mixing at or near the time of use, the surfactant aids in the subsequent mixing process to achieve a good permanent suspension. Primarily, however, the surfactant aids in easy removal of the lapping composition from the ground surface after the surface has been sharpened and simultaneously removes virtually all residue from the lapping operation, whereby a clean, lapped surface results. Hence, the amount of surfactant needed is only that amount that permits easy removal of the composition by washing. An amount of surfactant that proved sufficient for present purposes is in the range of about 0.08 to about 0.18 weight percent of the total composition while a preferred range is from about 0.11 to about 0.15 weight percent of the total composition. In the gel it has been determined that a surfactant in a range of from about 0.13 to about 0.30 weight percent of the gel is suitable with a preferred concentration in the range of from about 0.16 to about 0.26 weight percent. In the gel concentrate, the surfactant should be present in an amount of at least 0.25 weight percent. Actually, the upper limit of surfactant present is determined by suitability of composition viscosity which decreases with an increase of surfactant. With an aqueous composition including the surfactant, it is only necessary to use a water jet from a conventional water hose to completely wash the lapping composition and residue, including abraded metal from the surfaces. Thereafter, it is a further important asset that the lapping grit in the removed composition remains in suspension and can flow in the wash water stream to a catch basin, disposal area or the like.

A bacteriastatic or fungicidal ingredient is preferred in the composition to preserve same and is hereinafter sometimes referred to as a preservative. Formalin is a preferred ingredient though other preservatives such as methylparahydroxy benzoate, propylparahydroxy benzoate, parachlorometa cresol and the like may be employed.

Some mechanism is required to hold the grinding grit in permanent suspension. A carboxy vinyl polymer has been found to accomplish this result when present in the lapping gel concentrate in a range of about 1.89 to about 11.43 weight percent and preferably in the range of about 4.11 to about 5.03 weight percent. In an aqueous gel, the carboxy vinyl polymer is generally present in a range of from about 0.3 to about 1.25 weight percent, preferably about 0.45 to about 0.55 weight percent. Further in the total composition, the carboxy vinyl polymer is present in a range of from about 0.18 to about 0.75 weight percent, and preferably about 0.25 to about 0.35 weight percent. A preferred carboxy vinyl polymer is a high molecular weight, hydrophilic, carboxy polymethylene marketed under a family trademark, Carbopol, by B. F. Goodrich Chemical Company. Carbopol 934, having an approximate molecular weight of 3,000,000 and Carbopol 941, having an approximate molecular weight of 1,000,000 are preferred members of the Carbopol family, especially when used as a blend in a ratio of 50 to 90 weight percent Carbopol 934 and 50 to 10 weight percent Carbopol 941. A most preferred blend is a mixture of 80 weight percent Carbopol 934 and 20 weight percent of Carbopol 941. The carboxy vinyl polymer is neutralized in the gel by slightly more than a stoichiometric amount of an organic or an inorganic base. Aqueous solution of sodium hydroxide and triethanolamine are preferred examples of neutralizing bases. As mentioned hereinafter, sodium hydroxide is a preferred base for neutalizing the carboxy vinyl polymr. pH adjustment, however, is preferably accomplished with an organic amine or the like to avoid excessive free sodium ions that would result in using much more sodium hydroxide than a stoichometric amount for neutralization of the polymer. Other known and conventional bases may be employed so long as no adverse side effects are created thereby. Preferably, enough base is added to the gel to adjust the gel pH to the range of about 7 to 9. In this pH range, a high viscosity gel is produced, which furthers stability of the grit suspension. In the neutralized form, the carboxy vinyl polymer permanently suspends the grinding grit at low concentrations. A non-neutonian composition results where a high yield value is found on the shear curve for same, which is indicative of good suspension stability. If desirable, viscosity modifiers such as carboxy methyl cellulose may be added, though these agents do not aid in holding the grit in suspension and thus are not good substituents for the required carboxy vinyl polymer constituent. A suitable Brookfield viscosity range for the lapping composition is in the range of about 1100 to about 3400, and preferably around 1400.

Grit used in the present lapping composition is not critical as to type. Any of the inorganic abrasive materials may be employed such as aluminum oxide, silicon carbide, diamond dust, the silicas, boron carbide, zirconium carbide, tungsten carbide and the like. Finely ground abrasives are used in polishing compositions. The present invention is not, however, primarily a polishing composition, but is intended for grinding and sharpening. Grit sizes for the present composition extend upwardly from approximately 88 microns. A preferred range of grit size is 170 to 60 mesh U.S. Standard Sieve size, which corresponds to 88 to 250 microns. Grit sizes in this range have been permanently suspended in lapping compositions according to the teachings of the present invention.

The lapping composition of the present invention thus contains a novel gel that will suspend grinding grit of a preferred size in the range of about 88 microns to 250 microns. It has further been determined that the constituents may be present in ratios of: 30 to 65 weight percent aqueous suspension gel to 70 to 35 weight percent grit. A preferred composition range is 45 to 65 weight percent aqueous gel to 55 to 35 weight percent grit. In the above composition range, a permanent grit suspension is obtained which shortens lapping time of reels due to improved adhesion of the lapping composition to the blades and improved ease of cleaning for complete removal of grit after sharpening.

In certain conditions water may evaporate from the lapping composition and cause "dry spotting" as defined herein. As such, a preferred composition includes a humectant which holds moisture in the composition to improve overall performance thereof. While glycerine is a preferred humectant, polyhydric alcohols such as sorbitol, and other known humectants may be employed.

Reference may be had to the following examples for a more complete understanding of the present invention.

EXAMPLE 1

A suspension gel was produced by mixing 225 grams Carbopol 934, a high molecular weight, carboxy polymethylene polymer marketed by B. F. Goodrich Chemical Company; 900 grams of a 10 percent solution of sodium hydroxide; 0.2 pounds of Tergitol 15-S-9, a nonionic biodegradable surfactant marketed by Union Carbide Corporation, Chemical Division; and 2.52 grams of formalin as a preservative for the surfactant; and 24.9 pounds of water. The above suspension gel was thoroughly mixed with water and an 80 mesh silicon carbide grit in a 1:4:4 volume ratio. A suspension resulted. Upon systematic bouncing of a container of the produced suspension, it was noted that grit began to settle to the bottom of the container. The bouncing was designed to simulate transport of the lapping composition to an ultimate destination in a car or truck. After the grit had settled, attempts were made to reconstitute the suspension by remixing. Only with great difficulty and mixing over an extended period of time (2 hours) was the grit resuspended in a suitable fashion.

EXAMPLES 2–11

Further gel compositions were produced in an attempt to establish operable limits for the carboxy polymethylene polymer. Data and results are tabulated in Table I. Only the percentages of Carbopol 934 and sodium hydroxide varied from the gel composition and procedure set forth in Example 1. Slightly more than a stoichiometric amount of sodium hydroxide was used in each example to realize a pH of 8.5.

TABLE I

| | LIMITS OF LAPPING COMPOSITION THICKENER | |
|---|---|---|
| Example No. | Amount of Gel Thickener gms/gal HOH | Suspension Condition |
| 1 | 75 | grit settled out |
| 2 | 80 | marginal |
| 3 | 83 | good suspension |
| 4 | 85 | good suspension |
| 5 | 95 | good suspension |
| 6 | 100 | good suspension |
| 7 | 110 | good suspension |
| 8 | 125 | good suspension |
| 9 | 135 | good suspension |
| 10 | 137 | viscosity marginally high |
| 11 | 140 | viscosity too high |

In the above examples, it can be seen that at too low concentration of Carbopol in the gel, the grit suspension is not stable. Further, at too high concentration of Carbopol, the viscosity of the composition is excessive and not conducive to a lapping operation.

EXAMPLE 12

The lapping composition of Example 6 was employed in lapping a reel type lawnmower that is used to cut golf greens. The reel was contacted with an external drive wheel and was rotated backwards at a speed of approximately 100 revolutions per minute. Lapping composition was painted onto the reel blades during rotation and the bed plate or cutting bar was adjusted to make light contact with the reel. Grinding continued until uniform contact was made between the reel blades and the bed plate. It was noticed during the lapping operation that the slurry walked along the blades slightly, but did not "walk off" the blades. There was thus no appreciable loss of grit during lapping. After grinding was completed, the reel was washed off with a garden hose. All of the grit, abraded metal and other residue was easily removed thereby.

EXAMPLE 13

The lapping operation of Example 12 was repeated with the exception that a 60 mesh silicon carbide grit was employed. A suitable permanent suspension resulted and the composition performed well in sharpening a lawnmower reel.

EXAMPLE 14

Example 12 was repeated with the exception that the silicon carbide grit was 120 mesh. Like results were noted.

EXAMPLE 15

Example 12 was repeated using an 80 mesh aluminum oxide grit. A good suspension and good lapping resulted.

EXAMPLE 16

The gel of Example 12 was tested for freeze-thaw stability. Once the gel was frozen and thawing started, a puddle of water appeared atop the gel composition due to a faster thaw rate for the water than the gel per se. After complete thaw, about ⅛ of the volume was represented by a water layer, indicating that at least a partial breakdown of suspension would occur with a complete lapping composition.

EXAMPLES 17–21

Gels were produced as defined in Example 16 with an addition of ethylene glycol as a freeze-thaw stabilizer. Data and results are set forth in Table II.

TABLE II
FREEZE-THAW STABILITY OF LAPPING GEL

| Example No. | Ethylene Glycol gms/gal Water | Water Layer After Thaw |
| --- | --- | --- |
| 16 | 0 | YES |
| 17 | 15 | YES |
| 18 | 20 | YES |
| 19 | 23 | NO |
| 20 | 25 | NO |
| 21 | 35 | NO |

Data from Table II illustrates that a freeze-thaw stabilizer in an amount of 23 grams per gallon of water permits even thawing of the lapping composition without a breakdown of the suspension.

EXAMPLE 22

A further lapping composition was produced from a gel: water: grit formulation, having a resulting composition as follows:

12.50 gms Carbopol 934 (0.24 wt. %)
5.63 gms NaOH (0.11 wt. %)
5.63 gms 15-S-9 surfactant (0.11 wt. %)
2414.41 gms HoH (45.9 wt. %)
2.88 gms Ethylene glycol (0.05 wt. %)
0.32 gms Formalin preservative (0.01 wt. %)
2816.81 gms 80 mesh silicon carbide (53.5 wt. %)

The above formulation exhibited excellent suspension stability. Moreover, less than one half the normal lapping composition was required to lap a reel mower. Thereafter, the reel was easily cleaned with a garden type hose and normal water pressure.

Further testing of the lapping composition has led to a better definition of the system. It was determined that the freeze-thaw stabilizer was not needed with certain compositions and that greater amounts of carboxy vinyl polymer, especially a blend of carboxy vinyl polymers of different molecular weights gave improved results. Further, during some operations, the composition at certain locations would tend to dry out, known as "dry spotting" which leads to uneven lapping. A humectant addition to the composition will hold moisture and reduce the dry spotting propensities. The following examples are directed to substantiate the above and other findings.

EXAMPLE 23

A lapping composition gel was produced by the following procedure. Water (375.3 pounds) was placed in a stainless steel tank equipped with a high speed sheer propeller type mixer. Tergitol 15-S-9 surfactant, in an amount of 1.15 pounds was then added along with 22.0 pounds of glycerine and 0.26 pounds of formalin. After blending, 2.2 pounds of Carbopol 934 and 0.55 pounds of Carbopol 941 were slowly sifted into the mixture to avoid lumping. Slurry mixing continued for several minutes to achieve uniformity, and 136.7 pounds of water were added. The resulting slurry was then transferred to a kneading type mixer and 11.55 pounds of a 10 percent aqueous sodium hydroxide solution were slowly mixed into the slurry which caused the slurry to change to a very viscous gel. Sufficient triethanolamine was then added to adjust gel pH into a range of 7 to 9. Gel Brookfield viscosity was measured at approximately 1150 centipoises.

EXAMPLE 24

The lapping gel of Example 23 was blended with 80 mesh silicon carbide grit at a ratio of 60 weight percent gel and 40 weight percent grit. A permanent suspension resulted having good shelf life. Using the above lapping compound, a reel type mower was lapped according to the procedure of Example 12. Excellent lapping resulted and all of the lapping compound was easily removed by water from a garden hose.

The composition of the lapping compound was as follows:

| INGREDIENT | WEIGHT, LBS. | WEIGHT, % | GEL ONLY WEIGHT % |
| --- | --- | --- | --- |
| Carbopol 934 | 2.2 | 0.24 | 0.40 |
| Carbopol 941 | 0.55 | 0.06 | 0.10 |
| 10% NaOH | 11.55 | 1.26 | 2.10 |
| Water | 512.00 | 55.88 | 93.14 |
| Glycerine | 22.00 | 2.40 | 4.00 |
| 15-S-9 | 1.15 | 0.13 | 0.21 |
| Formalin | 0.26 | 0.03 | 0.05 |
| Grit | 366.47 | 40.00 | |

EXAMPLES 26–30

Lapping compositions as defined above were produced with the changes made to the Carbopol blend. In each case the total Carbopol amount was 0.50 weight percent in the lapping gel. Additionally, the overall lapping compositions contained 53 weight percent 80 grit silicon carbide and 47 weight percent aqueous lapping gel. Results are set forth below.

| EXAMPLE NO. | WEIGHT % 934 | WEIGHT % 941 | LAPPING | EASE OF REMOVAL |
| --- | --- | --- | --- | --- |
| 26 | 50 | 50 | Good | Good |
| 27 | 60 | 40 | Good | Good |
| 28 | 70 | 30 | Better | Good |

| EX-AMPLE NO. | WEIGHT % 934 | WEIGHT % 941 | LAPP-ING | EASE OF RE-MOVAL |
|---|---|---|---|---|
| 29 | 80 | 20 | Excellent | Good |
| 30 | 90 | 10 | Good | Good |

The blend of carboxy vinyl polymer at an 80/20 Carbopol 934 to Carbopol 941 appeared to yield the best results.

EXAMPLE 31

The lapping compositions of Examples 6 and 24 were varied as to the amount of surfactant on the lower end of the range. At amounts less than approximately 0.08 weight percent based on the total composition, the lapping compound became difficult to remove from the mower reels after lapping according to Example 12, and at an amount of approximately 0.06 weight percent surfactant, the composition was removeable only with great difficulty. A greater amount of surfactant may be added than shows in the particular Examples. An increase in surfactant above he cited range level, however, also causes a decrease in viscosity, and thus does not add appreciably to the intended purpose for inclusion in the present composition.

EXAMPLE 32

In certain marketing situations, it appeared desirable to produce a lapping gel concentrate which could be later mixed with water and grit. Transportation economics are thus fostered. A lapping gel concentrate was produced according to the procedures of Example 23 and had the following composition.

| INGREDIENT | WEIGHT, LBS. | WEIGHT % |
|---|---|---|
| Carbopol 934 | 0.220 | 3.41 |
| Carbopol 941 | 0.055 | 0.85 |
| 10% NaOH | 1.155 | 17.88 |
| Glycerine | 2.860 | 44.27 |
| 15-S-9 | 0.115 | 1.78 |
| Formalin | 0.275 | 4.26 |
| Water | 1.780 | 27.55 |

When 48.82 pounds of water are later added to the above 6.46 pounds of gel and thoroughly mixed, a lapping gel as defined in Example 23 results.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. An aqueous lapping composition consisting essentially of:
   a. a lapping gel, said gel comprising from about 0.3 to about 1.25 weight percent of a carboxy vinyl polymer thickener; sufficient base to neutralize said polymer thickener and provide a pH in the range of from about 7 to about 9; at least 0.13 weight percent of a surfactant and water; and
   b. an inorganic grinding grit.

2. The aqueous lapping composition as defined in claim 1 wherein the lapping gel further comprises a humectant.

3. The aqueous lapping composition as defined in claim 2 wherein the lapping gel further comprises a preservative for the surfactant.

4. An aqueous lapping composition consisting essentially of:
   a. a lapping gel comprising from about 0.3 to about 1.25 weight percent of a carboxy vinyl polymer; sufficient aqueous base to neutralize said polymer and provide a pH in the range of about 7 to 9; at least 0.13 weight percent of a surfactant; a humectant, a preservative for the surfactant, and water; and
   b. an inorganic grinding grit.

5. A lapping composition concentrate consisting essentially of:
   a. a lapping gel comprising from about 1.89 to about 11.44 weight percent carboxy vinyl polymer; sufficient base to neutralize said polymer and provide a pH in the range of approximately 7 to 9 when the concentrate is diluted; at least 0.25 weight percent of a surfactant; a preservative for the surfactant; and water; and
   b. an inorganic grinding grit.

6. An aqueous lapping composition comprising:
   a. about 0.3 weight percent of carboxy vinyl polymer, said polymer being a mixture of about 80 weight percent of a carboxy polymethylene polymer having a molecular weight of approximately 3,000,000 and about 20 weight percent of a carboxy polymethylene polymer having a molecular weight of approximately 1,000,000;
   b. about 1.26 weight percent of a 10 percent solution of sodium hydroxide;
   c. about 2.40 weight percent glycerine;
   d. about 0.13 weight percent of a nonionic, biodegradable surfactant;
   e. about 0.03 weight percent formalin;
   f. about 55.88 weight percent water; and
   g. about 40 weight percent of an inorganic grinding grit.

7. The aqueous lapping composition as defined in claim 1 wherein the carboxy vinyl polymer is present in the gel in an amount in the range of from about 0.45 to about 0.55 weight percent.

8. The lapping composition as defined in claim 7 wherein the carboxy vinyl polymer is a blend of polymers having different approximate molecular weights of 1,000,000 and higher.

9. The lapping composition as defined in claim 8 wherein one polymer has an approximate molecular weight of 3,000,000 and is present in a range of from about 50 to about 90 weight percent of the polymer blend, and another polymer has an approximate molecular weight of 1,000,000 and is present in a range of from about 50 to about 10 weight percent of the polymer blend.

10. The aqueous lapping composition as defined in claim 4 wherein the carboxy vinyl polymer is a blend of carboxy polymethylene polymers, a major polymer in said blend having an approximate molecular weight of 3,000,000 and a minor polymer in said blend having an approximate molecular weight of 1,000,000.

11. The aqueous lapping composition as defined in claim 10 wherein said major polymer is present in an amount in the range of about 50 to about 90 weight percent of said blend and said minor polymer is present in an amount of about 50 to about 10 weight percent of said blend.

12. The aqueous lapping composition as defined in claim 4 wherein the carboxy vinyl polymer is a blend of carboxy polymethylene polymer, the base is aqueous soldium hydroxide, the humectant is glycerine and the preservative is formalin.

13. An aqueous lapping composition as defined in claim 4 wherein 0.5 weight percent carboxy vinyl polymer is present, said polymer being a blend of 80 weight percent of a carboxy polymethylene having an approximate molecular weight of 3,000,000 and 20 weight percent of a carboxy polymethylene having an approximate molecular weight of 1,000,000; the base is 2.10 weight percent of a 10 percent solution of sodium hydroxide; 0.20 weight percent of a nonionic surfactant is employed; the humectant is 5.17 weight percent of glycerine; and the preservative is 0.50 weight percent of formalin.

14. A lapping composition concentrate as defined in claim 5 wherein the carboxy vinyl polymer is a blend of carboxy polymethylene polymers, the base is aqueous sodium hydroxide, the surfactant is of nonionic character, and the surfactant preservative is formalin.

15. A lapping composition concentrate as defined in claim 14 comprising further a humectant in said gel.

16. A lapping composition concentrate as defined in claim 5 wherein the carboxy vinyl polymer is 4.58 weight percent of a blend of approximately 80 weight percent of a carboxy polymethylene having an approximate molecular weight of 3,000,000 and approximately 20 weight percent of a carboxy polymethylene polymer having an approximate molecular weight of 1,000,000; the base is 19.22 weight percent of a 10 percent aqueous solution of sodium hydroxide; the surfactant is 1.91 weight percent of a nonionic surfactant; the preservative is 0.4 weight percent of formalin; and comprising further as a humectant, 36.60 weight percent of glycerine.

17. The aqueous lapping composition as defined in claim 1 wherein the gel is present in a range of from about 65 to about 30 weight percent and the grit is present in a range of from about 35 to about 70 weight percent.

18. The aqueous lapping composition as defined in claim 3 wherein the carboxy vinyl polymer is present in an amount of 0.50 weight percent and is a blend of approximately 80 weight percent of a carboxy polymethylene polymer having an approximate molecular weight of 3,000,000 and 20 weight percent of a carboxy polymethylene polymer having an approximate molecular weight of 1,000,000; the base is 2.10 weight percent of a 10 percent aqueous solution of sodium hydroxide; the surfactant is a biodegradable, nonionic surfactant and is present in an amount of 0.20 weight percent; the humectant is glycerine and is present in an amount of 5.17 weight percent, and the preservative is formalin and is present in an amount of 0.50 weight percent.

19. The aqueous lapping composition as defined in claim 18 wherein the grit is 80 mesh silicon carbide.

20. The aqueous lapping composition as defined in claim 18 wherein the grit is 120 mesh silicon carbide.

21. The aqueous lapping composition as defined in claim 18 wherein the grit is aluminum oxide.

22. The aqueous lapping composition as defined in claim 4 wherein the grinding grit is silicon carbide.

23. The aqueous lapping composition as defined in claim 4 wherein the grinding grit is aluminum oxide.

* * * * *